June 12, 1956 A. V. BEDFORD 2,750,442

FILM SHRINKAGE COMPENSATORY SYSTEM

Filed Aug. 13, 1948 5 Sheets-Sheet 1

Inventor
ALDA V. BEDFORD
By Ohie V. Mitchell
Attorney

June 12, 1956 A. V. BEDFORD 2,750,442

FILM SHRINKAGE COMPENSATORY SYSTEM

Filed Aug. 13, 1948 5 Sheets-Sheet 2

Inventor
ALDA V. BEDFORD

By [signature]

Attorney

Inventor
ALDA V. BEDFORD
By
[signature]
Attorney

June 12, 1956 A. V. BEDFORD 2,750,442
FILM SHRINKAGE COMPENSATORY SYSTEM
Filed Aug. 13, 1948 5 Sheets-Sheet 4
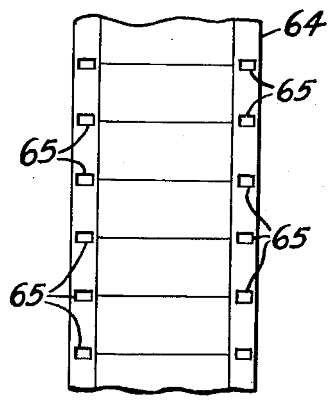
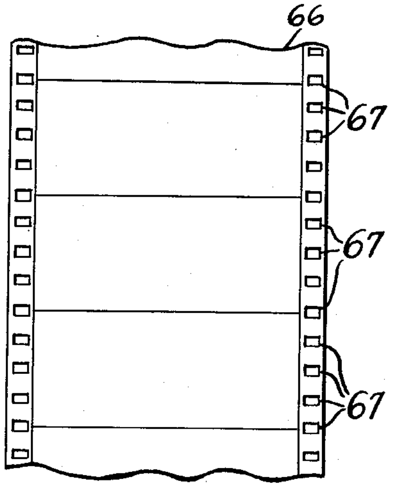
Fig. 5
Fig. 6
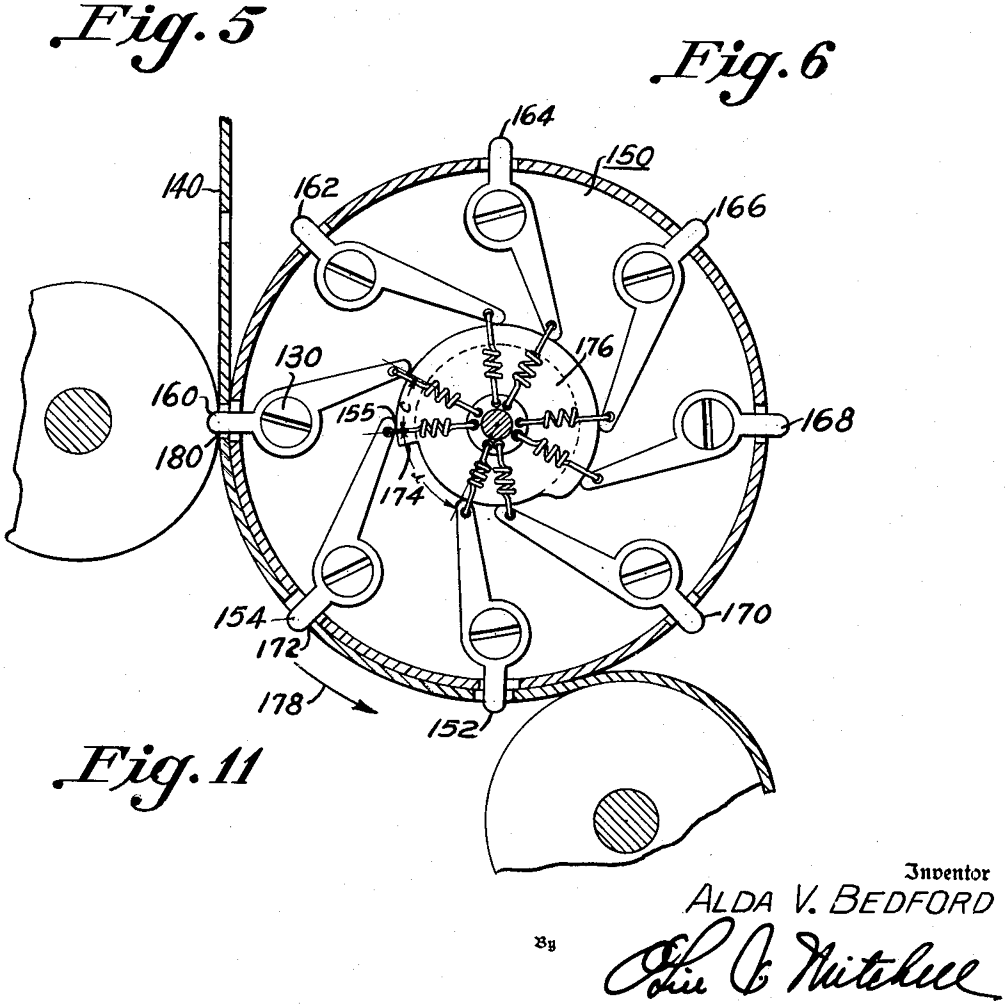
Fig. 11
Inventor
ALDA V. BEDFORD
By [signature]
Attorney Inventor
ALDA V. BEDFORD
By [signature]
Attorney United States Patent Office 2,750,442 Patented June 12, 1956

2,750,442

FILM SHRINKAGE COMPENSATORY SYSTEM

Alda V. Bedford, Princeton, N. J., assignor to Radio Corporation of America, a corporation of Delaware Application August 13, 1948, Serial No. 44,013

8 Claims. (Cl. 178—7.1)

The present invention relates to motion picture film driving mechanisms and more particularly to drive systems designed to compensate for film shrinkage effects in motion picture film television scansion apparatus.

The use of motion picture film for television program material is becoming more and more prevalent as the art progresses and as its use becomes more important, more stringent requirements are being exacted of equipment employed to faithfully transform the motion picture photographic information into television video signals. Presumably, if the quality of motion picture film photographic records is kept reasonably high and a photoelectric system which is faithful in responding to the range of film densities borne by the film is employed in the film scansion, the quality of the reproduced television image at the present state of the art will be at least as good, if not better than the television image produced from camera tubes operating directly from the scene to be televised. This, of course, presupposes that the noise level introduced into the picture by the scansion mechanism is kept reasonably low and that uniform photoelectric response over the entire film frame area is achieved.

Recent developments have indicated that a flying spot scansion system applied to continuously moving motion picture film provides an exceptionally high quality of television image which is unusually free from objectionable shading effects and evidences a minimum of random noise attributable to photoelectric effects. However, even with the improvements to be derived from flying spot scansion of continuously moving film, the quality of the reproduced television image generally suffers degradation as the result of film shrinkage due to changes in humidity, temperature and aging of the film material. As will be more fully appreciated hereinafter, in a continuous film motion type of scanner or projection system, film shrinkage effects normally may cause serious misregistration of successive film frames of sections thereof.

Since the standards of the motion picture film industry have been set at a film frame projection or presentation rate of 24 frames per second while television systems employ field scansion rates different from 24 frames per second (RMA television standards in United States requiring an interlaced 30 frames per second requiring 60 field scansions per second) it is normally required to provide some means of resolving the 24 frame per second reproduction of the motion picture film to the field transmission characteristics of the television system. A number of methods for accomplishing this resolution have been proposed a few of which are discussed by E. W. Engstrom, G. C. Beers, and A. V. Bedford in an article entitled "Application of motion picture film to television" published in the Journal of the Society of Motion Picture Engineers for June 1930. Other projection schemes of this type are discussed by Fordyce Tuttle and Charles D. Reid in the "Problem of motion picture projection from continuously moving film" in the same journal for February 1932. Furthermore, a copending United States application by A. V. Bedford and G. C. Szkilai entitled "Television Film Scanners," Serial No. 43,986, filed August 13, 1948, provides additional improvements in the television scansion of moving film. However, each method of scanning motion picture film, presently known to the art, is vulnerable to the deleterious effects on the image quality produced by film shrinkage.

The present invention concerns itself with a film propulsion system for continuously moving film scansion systems which substantially compensates for film shrinkage effects and thereby renders the reproduced television image substantially free from lack of definition caused by misregistration of film frame information attributable to shrinkage effects.

The present invention provides a method of motion picture film propulsion for television scanning systems which compensates for film shrinkage effects by interrupting the passage of the film through the scanning apparatus during predetermined intervals whose timing is in synchronism with the scansion function of the apparatus. In one of its more practical forms the invention provides the aforementioned suspensions in film motion through the action of a novel film driving sprocket adapted to drivingly engage the motion picture film driving perforations. The sprocket driving teeth are movable on the surface of the sprocket and a mechanism is provided for controlling the positioning of the teeth while the sprocket is in driving relationship with the film such that driving engagement of particular teeth on the sprocket with the film may be interrupted with consequent suspension of film motion. As will be seen more clearly as the specification proceeds, this action may be controlled and timed to substantially compensate for film shrinkage effects in television scansion systems.

It is therefore a purpose of the present invention to provide a motion picture film propulsion system for application in television motion picture film scansion systems whereby compensation for film shrinkage effects is automatically and continuously provided.

Another object of the present invention resides in the provision of a motion picture film sprocketing system adapted for use in connection with continuous film motion television scansion apparatus, wherein the sprocketing system produces a series of momentary suspensions in film motion of predetermined time duration and timing, such as to improve the registration of portions of reproduced television images when the scansion is under the influence of film shrinkage.

It is further a purpose of the present invention to provide a mechanical sprocket having movable teeth thereon adapted to engage the film driving perforations in motion picture film, the position of said teeth on the surface of said sprocket being controllable to conditionally disengage certain film driving perforations at predetermined time intervals for predetermined time durations.

It is further an object of the present invention to provide a mechanical sprocket having movable driving teeth thereon for driving engagement of motion picture film driving perforations, said sprocket being adapted for use in motion picture film television scansion systems of the continuous film motion variety, said sprocket having a control mechanism adapted for actuation externally to the sprocket, adapted to rhythmically alter the position of the sprocket teeth thereon according to a predetermined pattern such as to provide driving engagement of the motion picture film by only one sprocket tooth at a time, whereby definition defects in reproduced television images due to film shrinkage effects are reduced.

Another object of the present invention resides in the provision of a simple means for synchronizing successive interruptions of film passage through continuous film motion television scansion apparatus so as to occur only during television blank out intervals, whereby compensation for film shrinkage effects may be made during these intervals without impairing the appearance of reproduced television image obtained therefrom.

Other advantages and features which are believed to be characteristic of the present invention will become apparent through the perusal of the following specification, particularly when considered in connection with the accompanying drawings wherein.

Figures 1, 12:
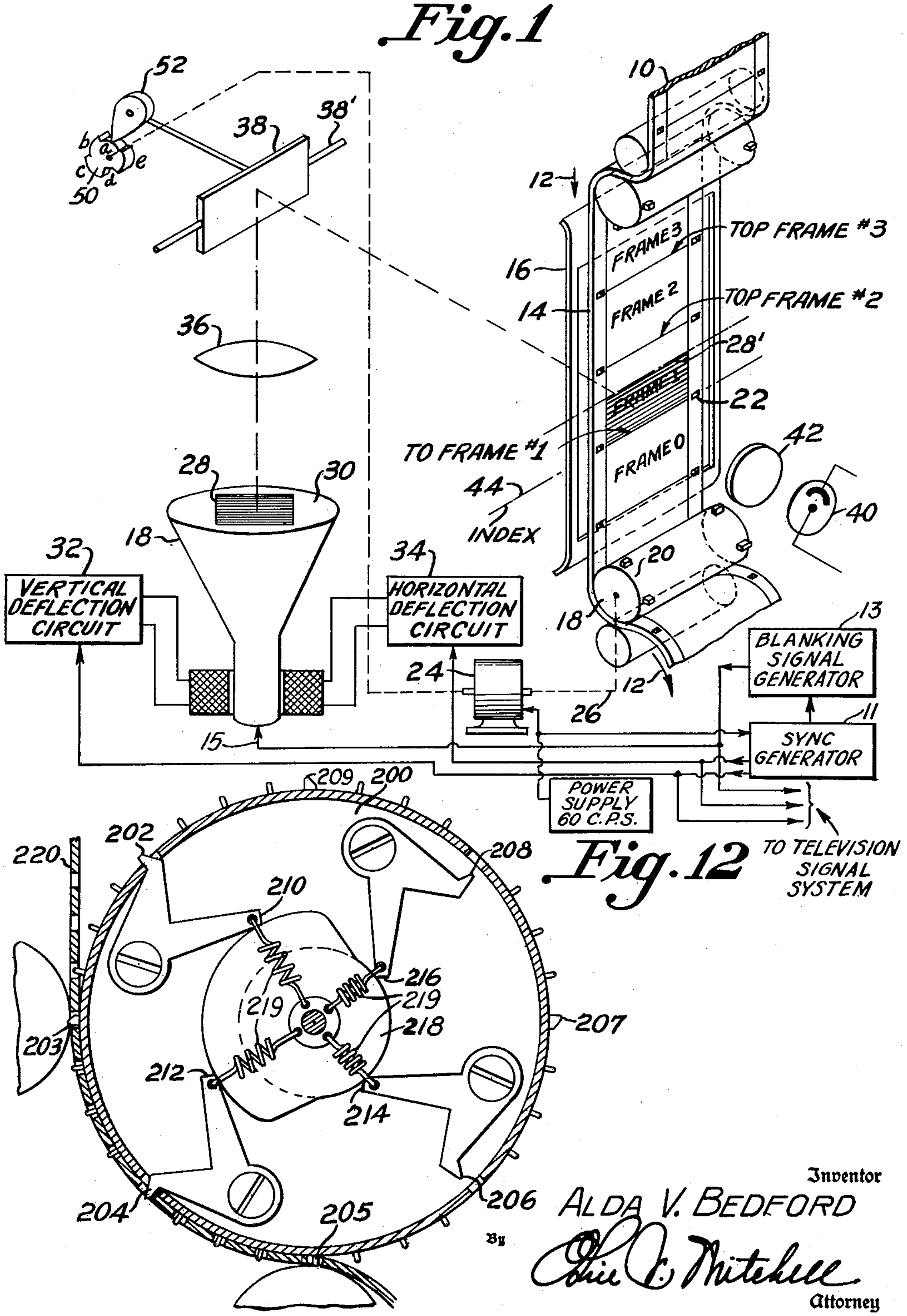
Figure 1 illustrates one form of film scansion system to which the present invention may be applied.
Figure 2:
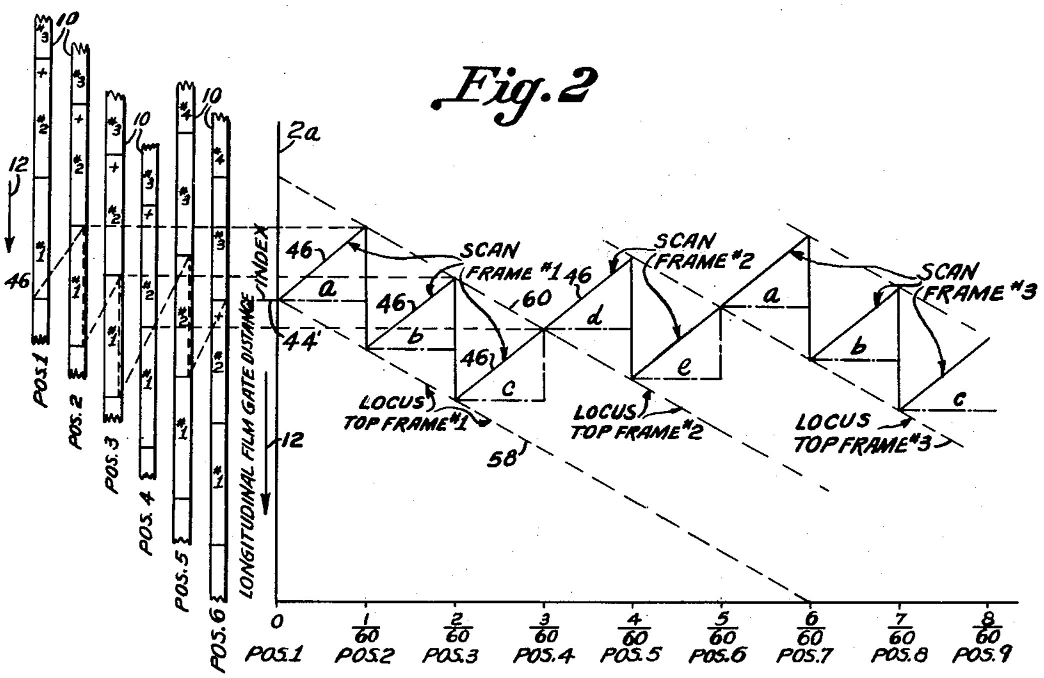
Figure 2 is a graphical representation of certain normal mechanical functions typical of the apparatus shown in Figure 1.
Figure 3:
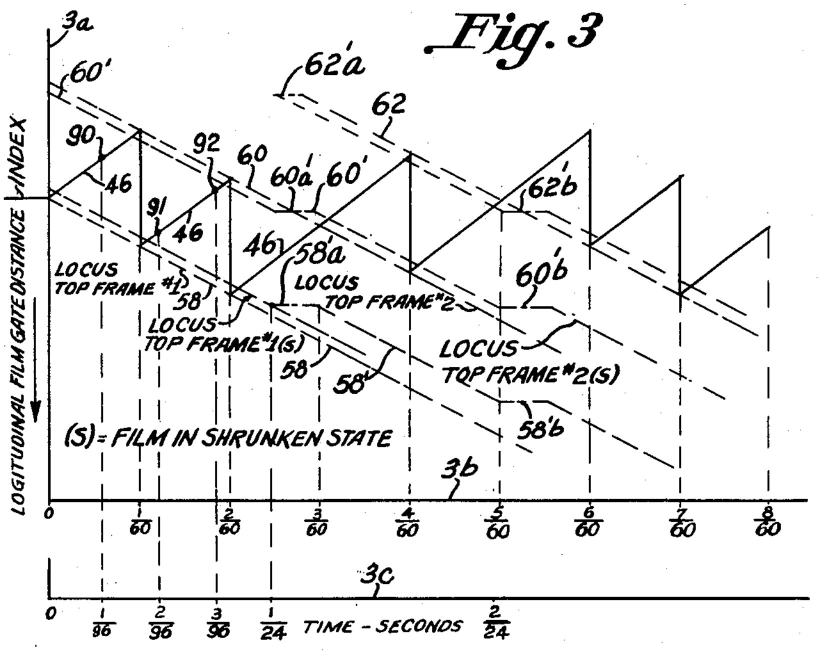
Figure 4:
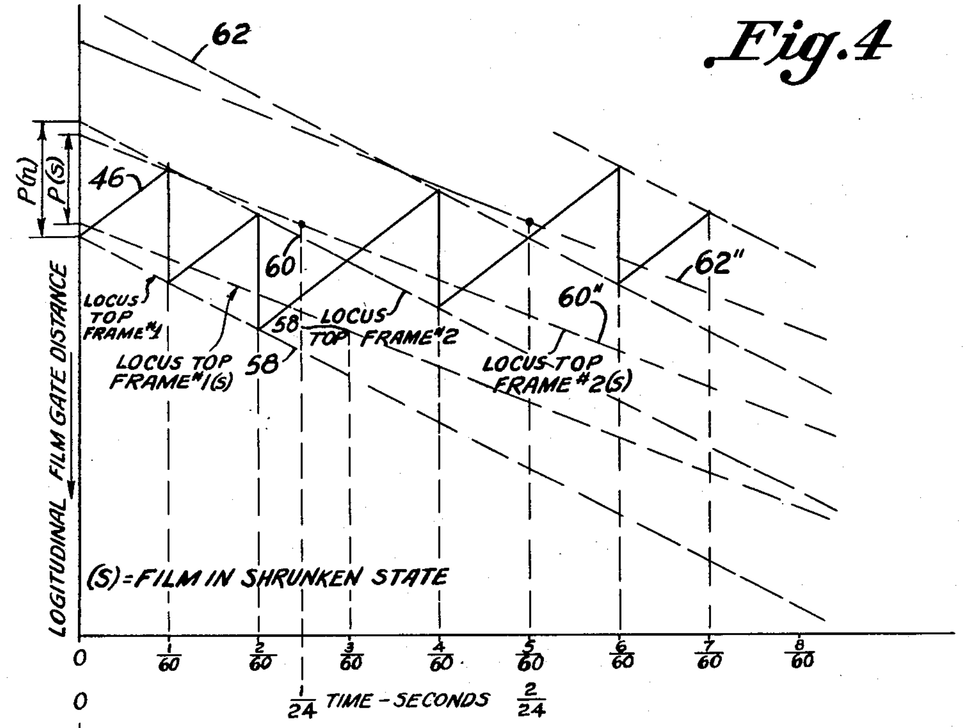
Figure 9:
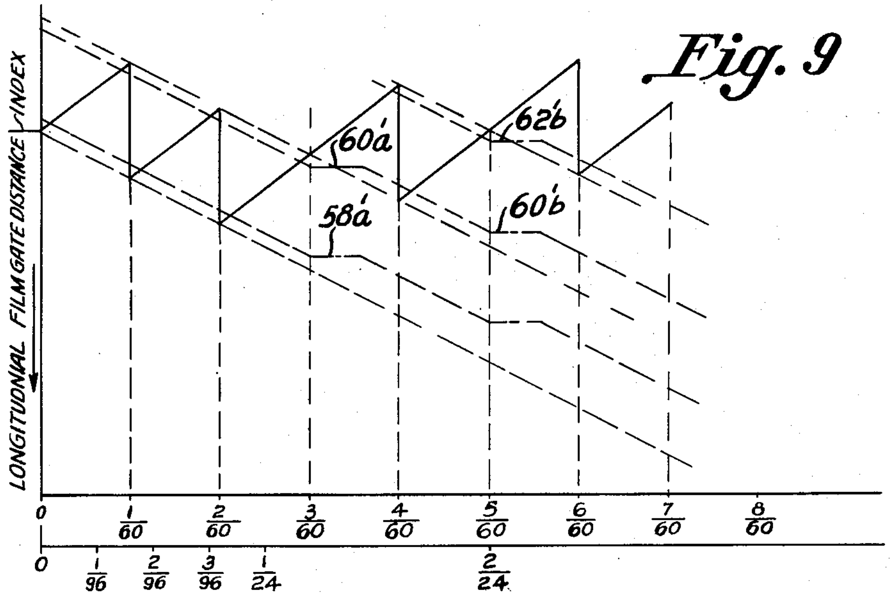
Figure 7:
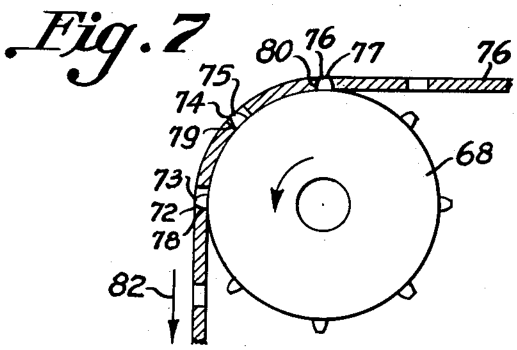
Figure 8:
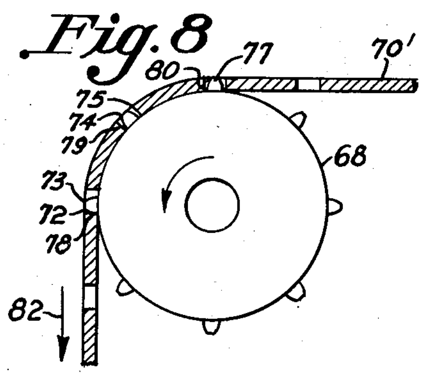
Figure 10:
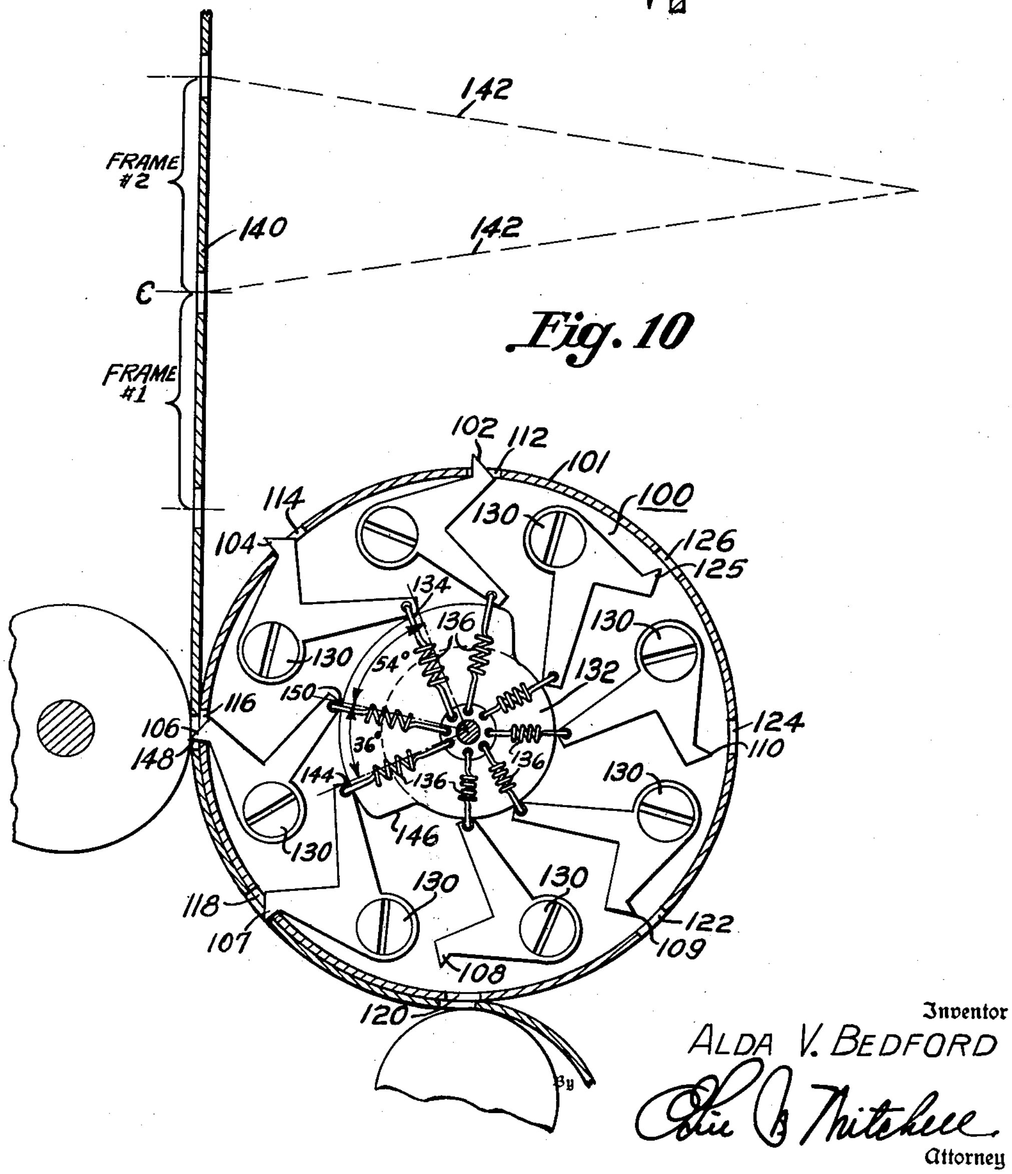

Figure 3 graphically illustrates the mechanical functions set forth in Figure 2 in connection with abnormal mechanical operation of the apparatus in Figure 1 due to film shrinkage;

Figure 4 graphically illustrates the mechanical functions set forth in Figure 2 in connection with a particular form of abnormal mechanical operation of the apparatus in Figure 1 due to film shrinkage;

Figure 5 represents a section of 16 mm. motion picture film;

Figure 6 represents a section of 35 mm. motion picture film;

Figure 7 diagrammatically illustrates the mechanical relationship between a normal driving sprocket and normal motion picture film;

Figure 8 diagrammatically illustrates the mechanical relationship between a normal driving sprocket and shrunken motion picture film;

Figure 9 graphically illustrates the mechanical functions of the apparatus in Figure 1 when employing one form of the present invention;

Figure 10 depicts one form of film driving sprocket embodying features in accordance with the present invention;

Figure 11 illustrates another form of film driving sprocket embodying features in accordance with the present invention; and, Figure 12 depicts still another form of film driving sprocket incorporating features in accordance with the present invention.

Referring now to Figure 1, wherein is shown a basic flying spot continuous film motion television scansion system, motion picture film 10 is being impelled in the direction of the arrows 12 past an aperture 14 in a film gate 16 by means of a sprocket 18 having teeth 20 adapted for driving engagement of the film driving perforations such as 22. The sprocket 18 is provided with rotational force by means of motor 24 which is indicated as being mechanically linked to the driving sprocket 18 by means of the dashed line at 26. In accordance with well known principles of flying spot film scansion, one form of which is described in full detail by U. S. Patent No. 2,261,848, granted to P. C. Goldmark, issued November 4, 1941, an illuminated flying spot raster 28 is produced on the screen 30 of a kinescope 18 through the appropriate actions of horizontal and vertical deflection circuits 32 and 34. The lens 36 collects the light rays from the flying spot pattern 28 and projects them for deflection onto the surface of the rocking mirror 38. After being deflected by the rocking mirror 38 an image of the scanning pattern 28 is brought to focus upon the film 10. In the position shown in Figure 1, the image 28' of the scanning pattern 28 is disposed for scansion of an arbitrarily designated film area such as frame 1. Directly to the rear of the film 10 is the photoelectric cell 40 which receives the light rays of the scanning pattern image 28' after passing through the film and after being collected by the lens 42. Through suitable electronic circuits the output of this photocell is adapted to produce a television signal corresponding to the photographic information on film 10 as the flying spot comprising the pattern 28 describes the scanning pattern 28'.

The deflection circuits 32 and 34 operate in a well-known manner under control of signals generated by a sync signal generator 11 of any known or usual kind. In addition to providing control for the deflection circuits, the sync generator controls a blanking signal generator 13 which has a schematically indicated connection 15 for blanking the kinescope 18. As indicated on the drawing, both the sync generator 11 and the blanking signal generator 13 supply signals to the previously mentioned electronic circuits which produce the television signal. U. S. Patent No. 2,383,365, granted August 21, 1945, to George L. Beers, shows a blanking arrangement for electronic circuits producing a television signal as well as the application of blanking signals to a kinescope such as a monitor tube.

As is well known to the art in a continuous film scansion apparatus of this type, one procedure for resolving 24 frame per second film presentation rate to the RMA standard 60 field per second television standard, as is presently commercially employed in the United States, is to drive the film 10 at a 24 frame per second rate and then scan successive film frames three and two times respectively. For example, frame 1 may be scanned three times corresponding to $\frac{3}{60}$ of a second and frame 2 scanned two times corresponding to the remaining $\frac{2}{60}$ of a second, which comprises the $\frac{5}{60}$ or $\frac{1}{12}$ of a second period required for the presentation of two film frames.

Referring now to Figure 2 in combination with Figure 1, the film 10 is shown in discrete positions Nos. 1, 2, 3, 4, 5, and 6 as it is successively displaced longitudinally along the film gate in the direction of the arrow 12. For ease in describing the nature of the operations to follow, the index level 44 on the film gate 16 in Figure 1 is represented by line 44' described on the ordinate **2*a* of the graph in Figure 2. The ordinate 2*a* represents longitudinal film gate distance and the arrow 12 associated therewith again describes the direction of motion of the film relative to the film gate as it is projected. The index level 44' is conveniently taken as a starting position for the top of frame 1 (position 1) at the start of the triple scansion of frame 1. Here it will be remembered that in the normal projection of motion picture film, the top of the image photographed on the film frame is actually below the bottom of the film frame image due to the inversion of the motion picture film. Consequently in Figure 1, the image top, which will be referred to as simply "the top of frame 1," is coincident with the arbitrary index 44 on the film gate 16. The rocking mirror 38 is then oriented such that the top of the scanning pattern 28 is also coincident with the index line 44 and at the time zero or the beginning of film scansion, represented on abscissa 2*b* of Figure 2, the fluorescent spot on the scanning pattern 28 proceeds to scan the film 10 as the film 10 moves on to position No. 2. Study will show that the longitudinal height of the scanning pattern image 28' as projected on the film 10, need be only $\frac{3}{5}$ of a frame height to accomplish scansion of frame No. 1 by the time the film reaches position No. 2. The longitudinal position of the electron beam spot image, comprising the scanning pattern image 28', as it progresses in a direction opposite to film motion to execute its field scansion is represented by a locus line 46 in Figure 2. Therefore in the first $\frac{1}{60}$ of a second, which is the transition time between position No. 1 and position No. 2, film frame 1** is properly scanned the first of three times.

Since the scanning pattern image 28' in scanning a frame must always have its genesis coincident with the top of the frame image, the second scansion of frame 1 in its position shown by position No. 2 of the film 10, will require that the scanning pattern image 28' be shifted downwardly in the direction of film motion to position "*b*," whereas for the first scansion its genesis was established at level "*a*" which was coincident with the index level 44'. This necessary shifting of the scanning pattern is accomplished by the action of cam 50 acting upon the follower 52 which is in turn disposed to rotate the mirror 38 about its axis 38'. The five constant radius surfaces, designated as "*a*," "*b*," "*c*," and "*d*" on the cam 50 correspond to the necessary levels to which the genesis of the scanning pattern 28' must be shifted throughout the five part scansion cycle of the film 10. The cam 50 receives rotational drive in synchronism with the film driving sprocket by means of an appropriate mechanical linkage to the motor 24 indicated by line 54.

The cam position as shown in Figure 1 corresponds to the first scansion of film frame 1. However, for the second scansion of film frame 1, constant radius surface "*b*" will displace rotor 52 away from the cam axis such to shift the scanning pattern 28' to level "*b*" (in Figure 2) from which position the second scansion of frame 1 progresses and continues until the film reaches position No. 3. The third scansion of film frame 1 of course, is accomplished in a similar manner during the transition of the film between position No. 3 and position No. 4 during which scansion constant radius "*c*" of cam 50 has properly positioned the scanning pattern.

It is seen then that at the end of 3/60 of a second, frame 1 has been scanned the required three times and cam 50 then presents constant radius surface "*d*" of smaller radius, to the mirror follower 52 so as to raise the genesis of the scanning pattern 38' to level "*d*" (Figure 2) along the film gate in order to make ready for the first scansion of frame No. 2. This first scansion of frame 2 is accomplished during the transition of the film from position No. 4 to position No. 5. The second scansion of frame 2 then follows by positioning of the follower 52 in conformation with constant radius "*e*" of the cam 50 which maintains throughout the interval between position No. 5 and position No. 6. At the end of 5/60 of a second corresponding to position No. 6 of the film, scansion of both frame 1 and frame 2 has been properly accomplished and the scanning raster returns to the index level "*a*" or index 44' in readiness for the triple scansion of frame 3.

Considering now in more detail the graphical representation in Figure 2, it may be seen that the dashed line 58 represents the locus of the top of frame 1 whereas the dashed line 60 represents the bottom of frame 1 and/or the top of frame 2. Dashed line 62 accordingly, represents the bottom of frame 2 and/or the top of frame 3. Consequently the slope of the non-horizontal portions of lines 58, 60, and 62 represents the linear velocity of the film 10 in its propulsion through the scansion system of Figure 1. The straight line sections of curve 46 of Figure 2, hereinbefore described as representing the vertical progression of the flying spot as it scans a film frame, clearly illustrate the fact that successive film frames are properly in registration inasmuch as the extremities of these curve portions 46 lie on the locus lines 58, 60, and 62.

There is shown in Figures 5 and 6 respective sections of 16 mm. and 35 mm. motion picture film. It is noticed that the 16 mm. film 64 is provided with driving perforations 65 on the basis of one driving perforation per film frame, whereas the 35 mm. film 66 is provided with driving perforations 67 on the basis of four perforations per frame. The present invention is no way limited to the type of film used, but for sake of clarity and ease in comprehension, further description of the operation of the present invention will be directed to the use of 16 mm. film unless otherwise noted. Accordingly, in Figure 1, 16 mm. film is illustrated and although it is evident that the graph of Figure 2 is not in any way conditional upon the number of driving perforations per film frame, it does assume that the film 10 is being driven at a constant linear rate which for 16 mm. film is approximately 40 feet per second for 24 frame per second presentation rate.

Figure 7 illustrates the relation between a film sprocket such as 68 and motion picture film when properly driving an unshrunken motion picture film such as 70. It is seen that the leading edge of the teeth 72, 74, and 76 of the sprocket teeth 73, 75, and 77 are all in driving contact with the leading edges 78, 79, and 80 of the respective film sprocket driving perforations. Under such conditions the movement of the film 70 in direction of the arrow 82 by rotation of the sprocket 68 will be substantially at a constant linear rate. However, in Figure 8, the same sprocket 68 is shown in connection with a shrunken film 70'. It is then seen that only the leading edge 72 of the sprocket tooth 73 is in driving contact with the leading edge 78 of the film 70', while the other teeth 75 and 77 although necessarily engaged in the sprocket perforations, are not in contact with the respective leading edges 79 and 80 thereof. Hence, the sole driving force to the film is being applied by the leading edge of the sprocket tooth 73 as the film 70' progresses in the direction of the arrow 82. It is evident that upon further rotation of the sprocket, sprocket tooth 73 will disengage its film sprocket perforation, whereupon the film 70' will tend to halt due to lack of driving contact with either of the other teeth 75 or 77. Hence, neglecting friction effects between film and sprocket and inertia, the film 70' will remain stationary until the leading edge 74 of the sprocket tooth 75 moves sufficiently forward to contact the leading edge 79 of its film perforation, at which time constant velocity propulsion of the film will again be provided until such time as the sprocket tooth 75 disengages its film driving perforation. As a result of this action the shrunken film 70' is transported past the film gate 16 in Figure 1 with a series of hesitations, each hesitation or film halt being in duration proportional to the degree of shrinkage manifested by the film with said hesitations occurring once per film frame.

Turning now to Figure 3 the effects of this film shrinkage will be considered in connection with the scanning cycle hereinbefore described with reference to Figure 2. The dashed lines 58, 60, and 62 corresponding to the loci of the tops of frames 1, 2, and 3 respectively are again shown in their proper relationship to the scanning curve 46 for an unshrunken film. The redrawing of this dashed line loci has been executed simply for illustrative purposes. Now under the conditions of shrunken film the distances between the top and bottom of the respective frames due to the shrinkage of the film material therebetween will be reduced. The top of frame 1 of a shrunken film is indicated by the "dashed-dot" locus line 58' whereas the top of frame 2 under shrunken film conditions may be represented by the "dashed-dot" locus line 60'. The ordinate 3*a* of the graph in Figure 3, of course, represents longitudinal film gate distance as did the ordinate 2*a* in Figure 2 and the abscissa 3*b* is a time scale broken in 60ths of a second again in accordance with Figure 2. An additional abscissa 3*c* for cooperation with the ordinate 3*a* is provided as a secondary time scale and is subdivided into 24ths of a second. The first 24th of a second is in turn broken into 96ths of a second for reasons of convenience hereinafter to become evident.

The fact that the shrunken film as it is impelled past the film gate hesitates every 1/24 of a second as before brought out, may be illustrated by the horizontal sections 58'*a*, 60'*a*, and 62'*a*, of the "dashed-dot" loci of the tops of the shrunken film frames 1, 2, and 3. This illustration further shows that at the end of the first 24th of a second the film actually stands still, for all practical purposes, until the next sprocket tooth drivingly engages the film, at which time the film is driven at a constant linear speed until the next hesitation occurring at 2/24 second shown at 58'*b*, 60'*b*, and 62'*b*.

The film hesitations produced by film shrinkage effects, although even under conditions of severe film shrinkage, persist for a time duration of substantially less than a vertical blanking interval, and therefore the delay intervals as depicted in Figure 3 by the horizontal sections of the dashed loci lines, such as 58'a, are obviously grossly exaggerated in order to lend clarity to the illustration. For example, under conditions of 1% film shrinkage, the film would hesitate approximately 1% of 1/24 of a second or $.01 \times .04$ second=.0004 second, whereas the vertical blanking interval for a standard television signal is about 5% of 1/60 of a second or $.05 \times .016 = .0008$ second. Thus, it appears that for film shrinkage as large as 1%, the maximum duration of film shrinkage compensatory halts would not be greater than ½ of a vertical blanking interval. Furthermore, the halt intervals as represented by the horizontal sections of the film frame loci are depicted as being rather abrupt transitions from normal 24 frame per second film propulsion to a stationary mode and then followed by rapid acceleration up to the normal propulsion rate again. Obviously, in practice the inertia of the film itself would prevent such rapid deceleration and acceleration, thereby making the halt intervals more properly representable by a slowing down of the film propulsion rather than an actual film halt. However, to more clearly illustrate the principles underlying the operation of the present invention, an exaggerated halt period, as shown in Figure 3 as well as hereinafter depicted in Figure 9, has been utilized.

It will be observed that during the film transition from position No. 3 to position No. 4 (or during the third scansion of frame 1), the shrunken film will disadvantageously halt directly in the center of this third scansion cycle. Hence, the television field corresponding to the third scansion of frame 1 will necessarily be badly distorted and consequently not agree in registration with the scansions of the same frame accomplished during the first two field scansions of that frame. In the case of film frame 2, it is apparent that this halting or suspension of film motion due to film shrinkage effects, although occurring at 58'b, 60'b, and 62'b does not yield any deleterious effects inasmuch as they occur at the end of a television field scansion. For this instance in particular, the suspensions of motion begins at 5/60 of a second, which is equivalent to 2/24 of a second, or the time taken for television scansion presentation of two complete film frames. The reasons that no ill effects are felt from this film hesitation at this time, derives wholly from the fact that a television vertical blank out signal occurs at every 1/60 of a second or at a time when no video image information is being transmitted or reproduced.

Therefore in accordance with the present invention the hesitation in film movement normally occurring at 1/24 of a second as in Figure 3, is eliminated and postponed to occur at 3/60 of a second as shown at 58'a and 60'b in Figure 9. Consequently the necessary slippage of the film to make up for the shrinkage when postponed to occur at intervals of 3/60 and 2/60 of a second may be made to occur during television blank out intervals, during which hesitation of the film will create no problem.

From the foregoing analysis it appears that it is only necessary to insure postponement of only one film motion suspension due to shrinkage, namely that suspension corresponding to the ends of frames 1, 3, 5, 7, and so forth for operation as described in Figures 2 and 3, since the suspension occurring at the ends of frames 2, 4, 6, 8, etc. are of less concern. In most instances however, it is desirable also to provide additional means for insuring that the film motion suspension occurring at the ends of even numbered frames are initiated at exactly those 24th of a second intervals which coincide with the 60th of a second intervals such that the duration of the film suspension does not "hang over" the television blank out time.

It may be noted at this time that if 35 mm. film were being driven by successive driving perforations numbering four per frame, the hesitations or film shrinkage compensatory motion suspensions would occur at every 1/96 of a second and in accordance with Figure 3 the phenomenon illustrated at 58'a—60'a—62'a in connection with 16 mm. film would occur four times during the scansion of frame 1 which occurrent positions are indicated by dots 90, 91, 92, as well as at 58'. The distortion of the television images would therefore be markedly greater under these conditions. The obvious correction for this increased effect would be to provide active engagement of only one out of every four driving perforations by the sprocket for the 35 mm. film. Under such driving conditions for the 35 mm. film the remaining problem is identical to that as described in connection with 16 mm. film.

The teeth of the sprocket 68 shown in Figures 7 and 8 are illustrative of the very simplest form of sprocket tooth contours and no effort has been made to illustrate a type of tooth contour which would tend to minimize the abruptness at which the hereinbefore described shrinkage compensatory interruptions occur. Certain types of film sprocket tooth contours which tend to minimize the ripple or flutter imparted to the film due to the necessary shrinkage compensations are well known to the art and find particular usefulness in film systems incorporating sound track reproducing equipment. Such sprockets operate to impart a substantially constant rate of propulsion to the film under two conditions, to wit: for film exhibiting no shrinkage or for film exhibiting a discrete amount of shrinkage, under which latter conditions the sprocket necessarily reduces the average linear velocity of the film in the process of compensating for the shrinkage. The exact mechanism by which these types of sprockets operate are normally based upon particular forms of tooth contour designs and will not be herein considered in detail due to the familiar nature of such devices to those skilled in the art. However, it is to be noted that although such special "smoothing" sprockets operate to "smooth out" film flutter due to shrinkage effects and thereby impart to the film a constant but lower rate of propulsion, the registration problems resulting from shrinkage effects are in no way helped by the use of such sprockets.

The effect of a "smoothing" sprocket operating under ideal conditions to effect a reduced but constant velocity propulsion, free of "flutter" of shrunken film in connection with a television film scansion mechanism as described in connection with Figure 2, is illustrated in Figure 4. Again a portion of Figure 2 has been reproduced in Figure 4 to form a basis for comparison between conditions obtaining under operation with shrunken and unshrunken film. Accordingly, dashed loci lines 58, 60, and 62 again represent respectively the loci of the tops of frames 1, 2, and 3 as normal unshrunken film would be propelled through the system as illustrated in Figure 2. The pitch or distance between frames is here indicated by the arrow $P_n$ which is indicated for comparison with the pitch $P_s$, illustrated for film in a shrunken state. Correspondingly, the "dashed dot" lines 58'', 60'', and 62'' represent the respective loci of the tops of frames 1, 2, and 3 of shrunken film as it is propelled through the system shown in Figure 1 at a reduced constant velocity rate resulting from the action of an idealized special "smoothing" sprocket. Indeed the situation resulting in this case is even more aggravated from a registration standpoint than was exhibited in connection with the simple tooth action illustrated in Figure 3, for it is evident that whereas the first two scansions and a portion of the third scansion of frame 1 were in registration in Figure 3, here each successive scansion of frame 1 is displaced from the previous scansion and in registration therewith. Although in Figure 4 no particular distortion of the third scansion field of frame 1 is encountered due to sprocket tooth action in connection with shrunken film, it is seen that the cumulative action of the reduced but constant velocity of film propulsion results in successively deeper scansions into frame No. 0 during the intended three scansions of only frame 1. Manifestly then, the mere provision of constant velocity propulsion of the film at a reduced rate to compensate for linear shrinkage effects, in no way improves successive field registration in scansion systems of the type under consideration whereas controlled interruptions of the film motion according to the method disclosed and illustrated in Figure 8 do provide satisfactory correction of film shrinkage effects through the medium of the film driving mechanism.

According to the present invention in order to provide the necessary postponement of shrinkage compensatory halts of the film to insure occurrence at every 3/60 and 2/60 of a second for alternate film frames, a novel driving sprocket 100 shown in Figure 10 may be used. The driving sprocket 100 is provided with an even number of teeth 102, 104, 106, 107, 108, 109, 110 and 125 which may conditionally extend past the outer surface of the drum 101 through the openings 112, 114, 116, 118, 120, 122, 124, and 126 therein. Each of these sprocket teeth is rotationally pivoted about centers such as 130 shown in connection with tooth 104 so that they may be rotated to protrude beyond the sprocket outer surface 101 through the action of a stationary cam 132 adapted to engage the actuating ends such as 134 of the sprocket teeth as the sprocket rotates. The actuating ends of the sprocket teeth may be held against the surface of the cam by means of springs such as 136 providing an inward radial force on the cam actuated end. The cam 132 may be conveniently fixed relative to the scansion apparatus and the sprocket 101 may be rotated about the fixed cam and in so doing provide driving force to the film 140 which is illustrated to represent a film in a shrunken state. Under conditions of shrinkage the effective pitch between the successive film frames will be less than that of the nominal pitch between the teeth 102, 104, 106, and 107 in the position as shown. Hence, driving of the film 140 will be accomplished by only one sprocket tooth at a time as explained in connection with Figure 8. The sprocket in Figure 10 is shown in a phase corresponding to the third scansion of frame 1 and in accordance with Figure 9 just prior to the shift of the scanning pattern genesis represented for example, by dash line 142 from level *c* upwardly to level *d*. In the driving state illustrated in Figure 10 sprocket tooth 107 is actually driving the film at a constant linear velocity of the required 40 feet per second (for 16 mm. film) and maintains this driving film until position No. 4 of the film is reached. At that time the actuating end 144 of the sprocket tooth 107 encounters surface 146 of the cam 132 at which instant the tooth 107 drops to a position now illustrated by tooth 108, thereby disengaging the driving perforation of the film 140. As soon as the tooth 107 disengages the driving perforation the film then remains stationary while tooth 106 moves in the direction of sprocket rotation to encounter the leading edge 148 of its associated driving perforation. Of course the time delay or halt of the film resulting from the time necessary for the tooth 106 to contact the leading edge 148 of the driving perforation is represented by the interval *60'b*, of Figure 9, which occurs as before mentioned during a vertical television field blank out. Accordingly, the genesis of the scanning pattern 142 shifts from level *c* to level *d* at this time to properly execute the first scansion of frame 2.

After the second scansion of frame 2 another halt interval corresponding to *60'b* is required and in the case of the sprocket of Figure 10 this halt is provided by the release of the film by tooth 104 when the tooth actuating end 134 encounters the surface 146 of the cam 132. It is noticed that in order for the instances of release of the film by the sprocket to be alternately separated by 3/60 and 2/60 of a second, the actuating arms of alternate sprocket teeth such as 104, 107, 109, etc. are necessarily longer than the actuating arms of the remaining sprocket teeth 106, 108, 110, etc. Hence, the radial distance from the pivot point 130 of sprocket tooth 107 to its actuating end 144 is greater than the radial distance from the pivot point 130 of sprocket tooth 106 to its actuating end 150. Consequently, sprocket teeth 107, 104, 125, and 109 may be all identical, whereas sprocket teeth 106, 112, 110, and 108 may in turn be all identical. For 24 frames per second translation of the film 140 in Figure 10 the sprocket 100 would necessarily be rotated at three revolutions per second or 180 R. P. M. since there are eight sprocket teeth shown and 16 mm. film is under consideration. For the scansion sequence described, the actuating arm lengths of alternate teeth such as 107 and 106 and 104 will be such that the contact point of the actuating arms 144, 150, and 134 respectively on the control surfaces of cam 132 will be such to define the alternate angles *r* and *s* described by the dotted lines associated therewith, wherein the angle *r* would necessarily be:

$$r=2\times\left(\frac{3\times360}{60}\right)=36^\circ$$

while angle *s* would be:

$$s=3\times\left(\frac{3\times360}{60}\right)=54^\circ$$

The shrinkage compensating sprocket 150 shown in Figure 11 is practically identical in operational principle to the sprocket shown in Figure 10, however, the teeth 152, 154, 160, 162, 164, 166, 168, and 170 are adapted to rotate each about an axis 130 illustrated in connection with cam 160. As shown the tooth 154 is in driving engagement with the leading edge 172 of its respective sprocket and as soon as the actuating end 155 of the tooth 154 encounters the cam surface 174 the actuating arm 155 assumes a position similar to that shown by tooth 152, the control cam 176 remaining stationary with respect to the film scansion apparatus as in Figure 10. As the actuating end 155 of the tooth 154 is caused to conform to the reduced radial surface of the cam 176 the driving end 154 moves in a direction opposite to the film movement indicated by arrow 178. When this occurs the film 140 remains stationary until adjacent sprocket tooth 160 engages the leading edge 180 of its respective driving perforation. This latter action provides the necessary halting of the film and the timing afforded by the cam 176 in cooperation with the actuating ends of the sprocket teeth provides the necessary timing of the halting intervals. In other respects the operation of the apparatus is identical to that of the sprocket shown in Figure 10 and the alternate separational angles (*r* and *s*) of actuating arm contact points on the cam 176 are identical to the arrangements shown in Figure 9.

Another embodiment of the present invention in the form of a driving sprocket is shown in Figure 12 wherein the sprocket is adapted to driving a 35 mm. film of the type illustrated in Figure 5, said film having four driving perforations per frame. Features of the adjustable sprocket shown in Figure 12 are that the number of movable teeth has been reduced by ½ and three fixed "emergency" teeth have been spaced between the driving teeth in order to drive the film in case of failure of the film material surrounding the driving perforations engaging the driving teeth. The sprocket 200 comprises movable driving teeth 202, 204, 206, and 208 with fixed driving teeth 203, 205, 207, and 209 placed midway between the nominal positions of the movable teeth. In this arrangement the movable teeth actuating arms 210, 212, 214, and 216, respectively, operate on the fixed cam surface 218 to provide the forced release of the film 220 at 3/60 of a second intervals corresponding to position No. 4 in Figure 3. The actuating arms 201, 212, 214, and 216 are each provided with bias springs 219 which are similar to the springs 136 of Fig. 10. On the other hand, release of the film for motion suspension at the 2/60 of a second intervals, corresponding to position No. 6 in Figure 3, is accomplished by the fixed teeth such as 203, 205, 207, and 209, since this latter release normally occurs at integral multiples of 1/60 of a second and may be phased to take place during vertical blank out intervals as described in Figure 7. This latter form of shrinkage compensating sprocket although being simpler and generally more economical of manufacture does demand extreme precision in forming the fixed tooth contour in order to minimize any tendencies for sluggish release of the film perforation by the stationary teeth. Of course in the sprockets of Figure 10 and Figure 11 where release of the film by the sprocket teeth is mechanically implemented for release of the film at both the 3/60 and 2/60 of a second intervals, tooth contour tolerances may be considerably greater.

From the foregoing it is seen that the applicant has provided a novel method of film shrinkage compensation which lends itself particularly to television scansion of motion picture film and which finds ready application to existing film apparatus through the employment of a minimum of additional instrumentalities. Although the applicant has shown several forms of mechanical sprockets useful in producing controlled interruptions in film propulsion of a nature to compensate for film shrinkage effects during predetermined time intervals, it is to be understood that other methods of controlling the film motion in accordance with the present invention may be used with equally satisfactory results.

What is claimed is:

1. A propelling mechanism for minimizing the effect of material shrinkage in a perforated image bearing strip, said mechanism comprising a strip driving revolvable sprocket, means for rotating said sprocket to provide continuous motion of an image bearing strip engaged therewith, said sprocket having a plurality of teeth thereon for engaging the perforations of the strip one at a time to drive said strip at a constant rate during tooth engagement, each tooth being movable in said sprocket, mechanical linkage means for moving each tooth with respect to said sprocket, an activating member operatively cooperative with the linkage for said teeth as the sprocket revolves to move each tooth successively out of engagement with the perforations following a period of driving engagement of that tooth, said activating member being further disposed to return each tooth to a position for engagement with a strip perforation, a multiplicity of fixed teeth interspersed between said movable teeth, physical size and spacing of said fixed position teeth with respect to said movable teeth being such as to normally engage the strip perforations and to impart driving force to said strip upon passage of a portion of a strip distorted to vary normal spacing of its perforations, which normally spaced perforations would normally be engaged by a movable tooth.

2. Apparatus substantially as described in claim 1 wherein said central control mechanism comprises a stationary cam mounted axially with respect to said sprocket and having a control surface thereon disposed to move said sprocket tooth extensions.

3. In a television motion picture film scansion system wherein the film presentation rate is different from the television field scansion rate, such difference in rates of presentation being resolved by scanning alternate frames a different number of times from intervening frames and wherein an apparatus operating at a certain frequency is provided for sequential plural optical scansions of successive film frames, and having means for deriving from such film scansion a television signal train and means for blanking said signal for a predetermined period at the end of each field scansion, a film shrinkage compensatory driving mechanism energized from a source of the same said frequency, and having means for conditionally propelling motion picture film through the frame scansion apparatus of said system at a constant linear velocity, a mechanical control agency for establishing the intervals during which constant velocity film propulsion is to be provided, a synchronizing linkage between the said control agency and said film scansion apparatus to maintain a synchronous operating relationship between the two such that constant velocity film propulsion is provided during those intervals in which an individual film frame is being successively scanned a plurality of times, and means for periodically suspending the constant velocity propulsion of said film during selected intervals concomitantly with at least a portion of the television signal blankout periods occurring between the presentation of successive film frames, and means for establishing said selected intervals such that their individual time durations are proportional to the degree of shrinkage manifested by the film.

4. In a non-intermittent television picture film scansion apparatus operating at a certain frequency and having means for producing a television film image signal having quiescent periods corresponding to the vertical blankout period of the television system and in which apparatus the film frame presentation rate through a film scansion section is different from the film frame scansion rate but in which said film presentation is also derived from a source of electrical energy of the said certain frequency, an apparatus for compensating the effects of film shrinkage comprising in combination, means for rhythmically suspending the passage of film through the scansion section of the scansion apparatus, means for timing said suspensions to occur during said selected quiescent periods of film image signal utilization corresponding to the blanking portions of the composite signal of which the film image signal forms a part, means for altering the time duration of said timed suspensions in accordance with the degree of film shrinkage, said last-named means being responsive to the changes in pitch of the motion picture film driving perforations.

5. In a television motion picture film scansion system operating at a certain frequency wherein the film frame presentation rate is different from the television field scansion rate and wherein provision is made for sequential plural scansions of successive film frames and including means for deriving from such scansion a television signal and means for blanking said signal for a predetermined period at the end of each television field, a driving mechanism adapted to minimize the effects of film shrinkage, said driving mechanism being energized from a source of the said certain frequency, and comprising in combination, a rotatable driving sprocket having a plurality of teeth thereon for engaging the driving perforations of a motion picture film, means for rotating said sprocket to provide continuous motion of an image bearing strip engaged therewith, each tooth being movable in said sprocket and nominally spaced to provide driving engagement of said film by only one tooth at a time, an actuating extension on each tooth for determining the position thereof, a central control mechanism mechanically linked to said actuating extensions for establishing predetermined positioning of said sprocket teeth for selected rotational displacements of said sprocket, means for establishing said central control mechanism in mechanical synchronism with the recurrent television field scansions, and means for timing said selected rotational displacements of said sprocket whereby constant linear velocity propulsion of said film is maintained during sequential plural television field scansions of any individual film frame.

6. In a television motion picture film scansion system of the non-intermittent variety wherein apparatus is provided for sequential plural scansions of successive film frames the combination of, scanning means for producing scanning raster fields, means for separating said fields in time from one another by television blanking intervals and impressing the scanning raster fields on a scanning area, means energized from a source of electrical energy of a frequency equal to that of said scanning means for continuously propelling a motion picture film through said scanning area at a predetermined velocity, interrupting means connected with said propelling means for conditionally interrupting continuous film propulsion only during said blanking intervals, means responsive to the degree of shrinkage of film passing through said scanning area and coupled to said interrupting means for controlling the time durations of film interruptions in direct accordance with the degree of shrinkage manifested by the film.

7. In a television motion picture film scansion apparatus including means for producing from such scansion a film image signal and having means for producing quiescent periods corresponding to the vertical blankout periods of the television system, an apparatus for compensating the effects of film shrinkage, said apparatus having a scansion means tied to a certain frequency, means energized from a source of electrical energy of said same frequency for causing the passage of film through said scansion means, and comprising in combination, means for recurrently and periodically suspending the passage of film past said scansion means, means for timing the recurrent passage suspensions to occur only during quiescent periods of film image signal production corresponding to the blanking portions of the composite television signal of which the film image signal is to form a part, and means for altering the duration of the passage suspensions in accordance with the degree of shrinkage exhibited by the film.

8. In a television motion picture film scansion apparatus including means for producing from such scansion a film image signal and having means for producing quiescent periods corresponding to the vertical blankout periods of the television system, an apparatus for compensating the effects of film shrinkage, said apparatus having a scansion means tied to a certain frequency, means energized from a source of electrical energy of said same frequency for causing the passage of film through said scansion means, and comprising in combination, means for recurrently and periodically interrupting the movement of the film through said scansion means, means for timing said interruptions to occur only during selected quiescent periods of film image signal utilization corresponding to blanking portions of the composite television signal of which the film image signal forms a part, and means for altering the duration of said interruptions in accordance with the degrees of film shrinkage evidenced by changes in the pitch of the motion picture film driving perforations.

References Cited in the file of this patent

UNITED STATES PATENTS

| | | |
|---|---|---|
| 1,898,141 | Piper | Feb. 21, 1933 |
| 2,071,878 | Huc | Feb. 23, 1937 |
| 2,132,003 | Holst | Oct. 4, 1938 |
| 2,189,351 | Schroter | Feb. 6, 1940 |
| 2,200,086 | Kellogg | May 7, 1940 |
| 2,250,479 | Goldmark | July 29, 1941 |
| 2,268,891 | Mueller | Jan. 6, 1942 |
| 2,271,306 | Nichols | Jan. 27, 1942 |
| 2,277,693 | Dybvig | Mar. 31, 1942 |
| 2,401,596 | Winter | June 4, 1946 |
| 2,401,597 | Winter | June 4, 1946 |
| 2,487,870 | Harrison | Nov. 15, 1949 |

FOREIGN PATENTS

| | | |
|---|---|---|
| 89,630 | Austria | May 7, 1940 |
| 883,910 | France | July 26, 1943 |